United States Patent [19]

Groenefeld

[11] 4,260,129

[45] Apr. 7, 1981

[54] ROTARY SPHERICAL PLUG VALVE

[75] Inventor: Heinz Groenefeld, Hanau, Fed. Rep. of Germany

[73] Assignee: Honeywell Inc., Minneapolis, Minn.

[21] Appl. No.: 37,059

[22] Filed: May 8, 1979

[30] Foreign Application Priority Data

May 26, 1978 [DE] Fed. Rep. of Germany ....... 2822982

[51] Int. Cl.³ .............................................. F16K 31/44
[52] U.S. Cl. ...................................... 251/77; 251/88; 251/298; 251/308
[58] Field of Search ....................... 251/76, 77, 84, 88, 251/162, 163, 298, 308; 403/356

[56] References Cited

U.S. PATENT DOCUMENTS

| 2,807,485 | 9/1957 | Seibert | 403/356 |
| 2,919,885 | 1/1960 | Daigle | 251/308 |
| 3,014,332 | 12/1961 | Hubbard | 403/356 |
| 3,946,986 | 3/1976 | Sutter et al. | 251/298 |
| 3,963,211 | 6/1976 | Myers | 251/298 |
| 4,013,264 | 3/1977 | Friedell | 251/162 |
| 4,073,473 | 2/1978 | Rihm et al. | 251/298 |
| 4,074,889 | 2/1978 | Engel | 251/298 |
| 4,118,008 | 10/1978 | Myers | 251/298 |

FOREIGN PATENT DOCUMENTS

| 1072035 | 12/1959 | Fed. Rep. of Germany | 251/163 |
| 449422 | 12/1963 | Japan | 251/163 |
| 226087 | 12/1924 | United Kingdom . | |
| 372921 | 5/1932 | United Kingdom . | |
| 1344251 | 1/1974 | United Kingdom . | |
| 1443887 | 7/1976 | United Kingdom . | |

Primary Examiner—William R. Cline
Assistant Examiner—H. Jay Spiegel
Attorney, Agent, or Firm—Laurence J. Marhoefer; Lockwood D. Burton; Mitchell J. Halista

[57] ABSTRACT

A rotary spherical plug valve having an annular valve seat, a closure member formed as a portion of sphere, support arms for supporting the closure member with one of the arms being connected to a driving shaft at a hub having a hole for admitting the shaft with a slightly larger diameter than the shaft and a force transmitting means in the form of a cylindrical connection member disposed between a semi-cylindrical groove in the shaft and a semi-cylindrical internal recess in the wall surrounding the hole in the hub.

6 Claims, 6 Drawing Figures

ROTARY SPHERICAL PLUG VALVE

BACKGROUND OF THE INVENTION

1. Field Of The Invention

The present invention relates to fluid valves. More specifically, the present invention is directed to rotary spherical plug valves.

2. Description Of The Prior Art

Rotary valves using spherical plugs mounted on the end of support arm are well-known in the art, e.g., U.S. Pat. Nos. 4,118,008; 4,074,889; 4,073,473 and German Pat. Nos. 23 55 773 and 16 75 579 German Utility Model No. 75 06 291. In these prior art rotary valves using a spherical plug, a tight sealing of the valve is achieved either by a deformation or adjustment of the plug support arm or by a deformation of the seat ring or the valve which may be elastically resilient or movable or by a deformation of an outer part of the spherical plug cap forming the closure member which is chosen such that this outer part is slightly resiliently deformable. In all these prior art rotary valves, the rigid eccentric support of the rotary plug achieves an operation that only in the closed position the plug and the seat ring engage each other. When opening the valve the spherical cap is moved away from the seat ring caused by the eccentrical location of the driving shaft with respect to the central axis of the seat ring, which causes reduced friction and improves accuracy of control. The required closing force is determined by the amount of free cross-section at the inlet, the existing differential pressure between inlet and outlet side of the valve as well as by the eccentricity of the rotary plug bearing, that means the distance between the axis of the seat ring and the central line of the driving shaft. The maximum required torque is given by the product of cross-section area, differential pressure and eccentricity. For requiring an as small as possible torque and therewith an as small as possible force to be exerted by the valve operator one tries to keep the eccentricity as small as possible. In this connection, however, there are limitations which in the first line are determined by the friction between the rotary plug and the seat ring. If the eccentricity is too small there is a very small angle between the tangent at the spherical cup in the range of the seating edge on the one side and the surface of the seat ring on the other side so that there is the danger of sticking of the plug in the valve seat. This results that, in particular, in connection with spring loaded pnuematic actuators the plug is suddenly disengaging the valve seat when the valve is opened. This makes a fine control in the range of low flow rates difficult or even impossible.

SUMMARY OF THE INVENTION

It is the object of the invention to provide a rotary valve such that in spite of a small eccentricity a sticking of the closure member in the valve seat is avoided and therewith a smooth opening of the valve is achieved.

In accomplishing this and other objects, there has been provided, in accordance with the present invention, a rotary valve having an annular valve seat, a closure member formed as a portion of sphere, support arms for supporting the closure member with one of the arms being connected to a driving shaft at a hub having a hole for admitting the shaft with a slightly larger diameter than the shaft and a force transmitting means in the form of a cylindrical connection member disposed between a semi-cylindrical groove in the shaft and a semi-cylindrical internal recess in the hole in the hub.

BRIEF DESCRIPTION OF THE DRAWINGS

A better understanding of the present invention may be had when the following description is read in connection with the accompanying drawings, in which.

DESCRIPTION OF THE PREFERRED EMBODIMENT

Figure 3:
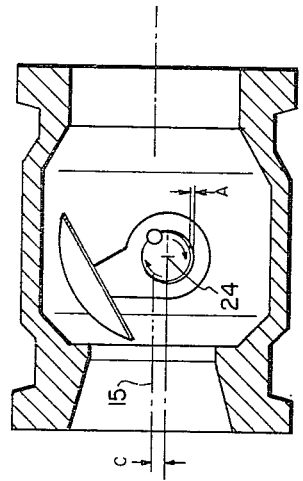
FIG. 3 shows the valve of FIG. 1 opened.
Figure 2:
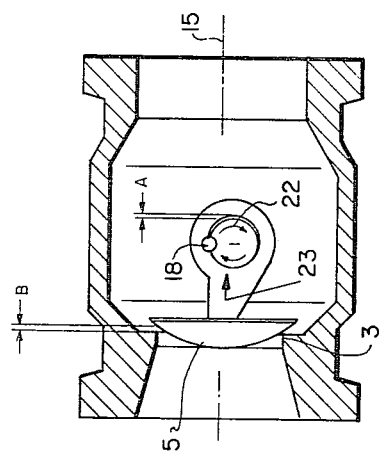
FIG. 2 shows the position of the closure member of the valve shown in FIG. 1 shortly after disengaging the seat.
Figure 1:
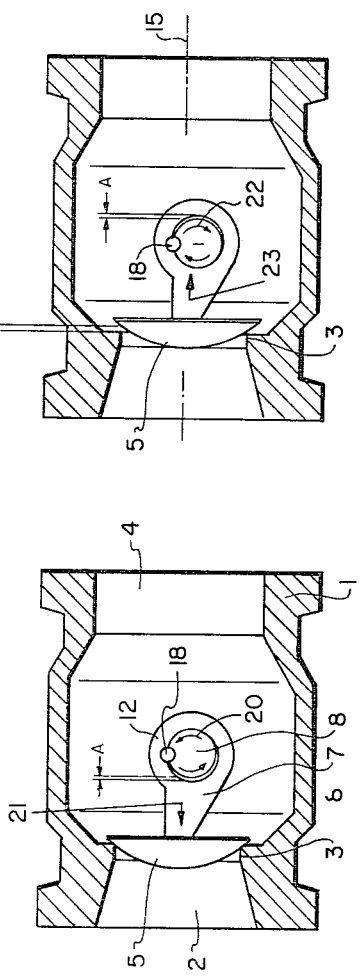
FIG. 1 shows an example of a rotary valve embodying the present invention in a closed condition.
Figure 5:
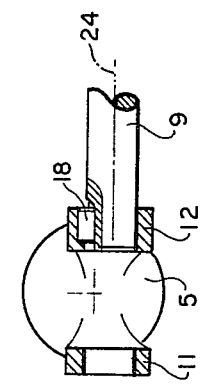
FIG. 5 shows the closure member, the cylindrical connection member and the end of the driving shaft before assembly of the valve shown in FIG. 1 whereat the hub of the supporting arms and the end of the driving shaft are shown in sectional view in the area of the recess.
Figure 4:
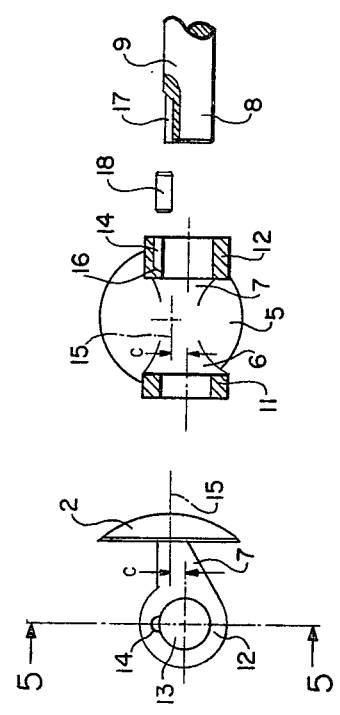
FIG. 4 shows the closure member of the valve of FIG. 1 together with the supporting arms in a side view.

Referring to FIGS. 1 to 3, the essentially tube-like valve housing 1 has on its inlet side 2 a valve seat 3 and is by its flanged inlet 2 and its flanged outlet 4 clamped between the flanges of a fluid carrying pipe, or tubing. The closure member 5 formed as a spherical cap is supported by two adjacent supporting arms 6 and 7 of which supporting arm 7 is shown in FIG. 1 as being connected in a force transmitting manner with the end 8 of driving shaft 9. As shown in FIG. 5, hub 11 of supporting arm 6 is borne on a stationary shaft end (not shown). As shown in FIG. 4, hub 12 of supporting arm 7 is provided with a semi-cylindrical recess 14 on the inner surface of hub bore 13 with the recess 14 projecting along bore 13 to a closed end, or side 16, facing the longitudinal axis 15 of the housing. In the closed position, of the valve, as shown in FIG. 1, the longitudinal axis of the housing 15, the central axis of the valve seat 3 and the central axis of the spherical cap forming the closure member 5 coincide.

Figure 6:
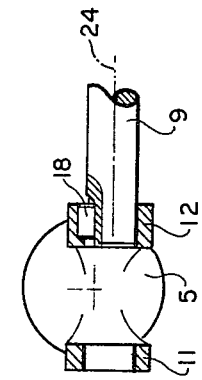
FIG. 6 shows the closure member and the driving shaft of FIg. 5 in an assembled condition also seen along the longitudinal axis of the housing from the outlet side of the valve housing to the valve seat.

As shown in FIG. 5, at an end 8 of driving shaft 9 a recess 17, also shaped in a semi-cylindrical fashion is provided whose form and length is matched with that of recess 14 such that a cylindrical connection member 18 just fits into the two semi-cylindrical recesses 14 and 17. By this connecting member 18 a forced transmitting connection is achieved between shaft 9 and closure member 5. Since at the one end recess 14 is closed at the internal end 16 and the length of recess 17 approximately corresponds to the thickness of hub 12 seen in the direction of the driving shaft, the cylindrical connecting member 18 in the assembled condition, as shown in FIG. 6, cannot fall out. On the other hand, easy assembly is possible as a comparison of FIGS. 5 and 6 clearly shows. By an exactly defined play, or diameter difference, between shaft 9 and the internal diameter of hub 12 which play preferably ranges at about 0.5% of the diameter of shaft 9, a sticking of the closure member 5 in the seat 3 of the valve is avoided. In the closed position of the valve, according to FIG. 1, shaft 9 generates a torque in the direction of arrows 20 on the connecting member 18 such that this connecting member via hub 12 and supporting arm 7 presses closure member 5 in the direction of arrow 21 onto the seat 3. Therewith the play A caused by the difference between the outer diameter of the shaft and the internal diameter of the hub is located at that side of the shaft 9 which is facing closure member 5.

In opening the valve the direction of the torque exerted by shaft 9 is reversed so that this torque now, according to arrows 22 in FIG. 2, is effective in a clockwise direction. Therewith the connecting member 18 draws closure member 5 in the direction of the longitudinal axis of the housing away from seat ring 3 by a distance B. The play A now is present on that side of shaft 9 which lies opposite closure member 5. This opening movement in the direction of the longitudinal axis 15 of the housing 1 is indicated by arrow 23. By this axial removal of the closure member 5 from valve seat 3, the closure member 5 is evenly removed from the seat 3 so that the valve can be opened smoothly, i.e., without a sticking of the closure member 5 to the valve seat 3.

Upon a further turning of the driving shaft 9, closure member 5 now is turned in the direction of the arrows 22 about the central axis of driving shaft 9 until the closure member 5 is in the open position, according to FIG. 3, and is removed from the direct flow path. The weight of closure member 5 and/or the reaction forces of the medium flowing through the valve in this open condition cause the play A to be located at that side of shaft 9 which is opposite closure member 5. The eccentricity C between the central axis 15 of valve seat 3 and of housing 1 on the one side and the central line 24 of driving shaft 9 on the other side is shown enlarged in FIG. 3 for better clarity.

When closing the valve the aforesaid steps follow each other in opposite order. As soon as the closure member 5 according to FIG. 3, is turned from the open position in a counter-clockwise direction until it engages with one edge the seat ring 3, the shaft 9 tilts and moves by means of the connecting member 18 the closure member 5 essentially in the direction of the longitudinal axis 15 of the housing 1 until a tight closing is reached around the entire circumference of the closure member 5 and the seat 3. The play A which initially, according to FIG. 2, was located at the side of the shaft 9 opposite the closure member 5 now travels with the reduction of gap B to the side facing the closure member 5 so that again the closed position is achieved as shown in FIG. 1. Further, during this turning and seating of the closure member 5 no friction is present between the closure member 5 and the seat ring 3. Accordingly, the closure member 5 can be adjusted precisely and smoothly which means a good control accuracy of the valve is achieved even in the range of a small flow cross-section. The use of a cylindrical connection member 18 leads to an essential reduction of the pressure load on the surface of the connection member and of the engaging wall portions of the shaft and the hub when compared with the situation of a prismatic force transmitting member.

The further advantage of using a cylindrical force transmitting member is that the semi-circular recesses 14 and 17 respectively, in the hub 12 and the shaft 9 respectively, can be worked by a single drilling operation. For this purpose shaft 9 is inserted through hubs 11 and 12 from the opposite side that means, from the left side in FIG. 5 and the bore is drilled from the right side. This single working operation guarantees proper alignment of the two recesses and, therewith, a good force, or torque, transmission between their walls and the connecting member 18. With respect to known rotary valves the new rotary valve is characterized not only by a better control accuracy in the range of low flow rates but further by a construction which is simple and can easily be assembled. There are no parts which within given limitations are deformable elastically and therewith could be subject to remaining deformation in case of overload as this is the case in the state of the art using elastic supporting arms, an elastic seat ring or elastic closure member edges.

Accordingly, it may be seen that there has been provided, in accordance with the present invention, an improved rotary spherical plug valve having a smooth operation from open to shut at all flow rates.

The embodiments of the invention in which an exclusive property or privilege is claimed are defined as follows:

1. A rotary valve having a rigid annular valve seat provided in a tube-like housing located concentrically to the longitudinal axis of said housing and having a rigid closure member formed as part of a sphere which is rigidly supported by two supporting arms one of which is connected to a driving shaft having a circular cross-section and extending transversely in the housing and being slightly offset with respect to the longitudinal axis of the housing, characterized in that a hub is provided at that end of the supporting arm connected to the shaft and a circular cross-section bore in the hub encircles a portion of the driving shaft which bore is slightly larger in diameter than the outer diameter of that portion of the driving shaft which extends into the circular cross-section bore in the hub and that for achieving a force-transmitting connection between the driving shaft and the hub a cylindrical connection member is provided extending in the direction of the driving shaft, with said connection member being disposed in an unsecured state between a semi-cylindrical groove in the outer surface of the driving shaft and a recess of semi-circular cross-section provided in the internal wall of the bore of the hub whereby the difference between the hub bore diameter and the diameter of said portion of said driving shaft creates play between said hub and said driving shaft which play prevents sticking of said closure member in said annular valve seat.

2. A rotary valve according to claim 1 and further characterized in that the semi-circular recess in the hub is closed at the end facing the longitudinal axis of the housing and that the length of the groove in the end of driving shaft corresponds approximately to the thickness of the hub seen in the direction of driving shaft.

3. A rotary valve according to claim 2 and further characterized in that the difference between the outer diameter of end of driving shaft and the internal diameter of hub is about 0.5% of the diameter of the shaft.

4. A rotary valve according to claim 2 and further characterized in that the recess in the hub and the groove in the shaft have a common radius.

5. A rotary valve according to claim 4 and further characterized in that the difference between the outer diameter of end of driving shaft and the internal diameter of hub is about 0.5% of the diameter of the shaft.

6. A rotary valve according to claim 1 and further characterized in that the difference between the outer diameter of end of driving shaft and the internal diameter of hub is about 0.5% of the diameter of the shaft.

* * * * *